U S 0 0 6 1 4 4 1 8 7 A

United States Patent [19]
Bryson

[11] Patent Number: 6,144,187
[45] Date of Patent: Nov. 7, 2000

[54] POWER MEASUREMENT FOR ADAPTIVE BATTERY CHARGER

[75] Inventor: Steven W. Bryson, Cupertino, Calif.

[73] Assignee: Fairchild Semiconductor Corporation, South Portland, Me.

[21] Appl. No.: 09/352,437

[22] Filed: Jul. 13, 1999

Related U.S. Application Data

[60] Provisional application No. 60/108,274, Nov. 12, 1998.

[51] Int. Cl.[7] ....................................................... H02J 7/00
[52] U.S. Cl. ............................................ 320/137; 320/164
[58] Field of Search ..................................... 320/137, 164, 320/160, 161, 162, 163

[56] References Cited

U.S. PATENT DOCUMENTS

| | | | |
|---|---|---|---|
| 5,465,039 | 11/1995 | Narita et al. ............................... | 320/164 |
| 5,600,230 | 2/1997 | Dunstan ............................ | 320/DIG. 21 |
| 5,698,964 | 12/1997 | Kates et al. ............................... | 320/164 |
| 5,723,970 | 3/1998 | Bell ........................................ | 320/140 |

OTHER PUBLICATIONS

O$_2$Micro, OZ950–DS–1.05, "Smart Battery Charger Controller", Apr. 29, 1998, pp. 1–15.

*Primary Examiner*—Shawn Riley
*Assistant Examiner*—Lawrence Luk
*Attorney, Agent, or Firm*—Townsend and Townsend and Crew LLP

[57] ABSTRACT

A highly flexible adaptive battery charger circuit that optimizes the efficiency of battery charging. The battery charger provides internal multiplier circuitry to measure input power allowing it to be used with AC adapters having different wattage. It further includes circuitry to digitally adjust threshold levels for the various control loops within the charger circuitry.

20 Claims, 3 Drawing Sheets

POWER MEASUREMENT FOR ADAPTIVE BATTERY CHARGER

CROSS-REFERENCES TO RELATED APPLICATIONS

This application is a Non-Provisional of Ser. No. 60/108,274, filed Nov. 12, 1998, and claims priority therefrom.

BACKGROUND OF THE INVENTION

The present invention relates in general to integrated circuits, and in particular to an input power measurement circuit for an adaptive battery charger.

With the proliferation of battery operated portable electronic devices. the demand for smaller and more efficient battery chargers has increased. To extend the life of the battery it is desirable to charge the battery even when the electronic device (e.g., laptop computer) is active and drawing power. One type of battery charger maximizes its efficiency by directing charge from the power source to the battery when the electronic device is powered up and operating, and depending on the level of power demanded by the electronic device. To implement this type of adaptive battery charging requires an accurate measurement of the input power available to the portable device. Existing battery chargers, such as one described in U.S. Pat. No. 5,698,964, assume a power source with a constant DC voltage, and measure the input power by a simple sensing of the input current. This technique, however, fails to address applications wherein the battery charger may be used in systems with varying power supply voltage levels.

Further, existing battery charger systems use fixed threshold levels to control the battery charging current and charging voltage. New types of batteries such as lithium ion batteries, however, have a variable charging cycle. That is, ideally a lithium battery is initially charged at a very fast rate up to e.g., 85–90%. Once it reaches that level, the charging must slow down to avoid over charging and over heating of the battery. Existing battery chargers with fixed charging threshold levels cannot support this type of variable charging.

There is a need for a more efficient and flexible battery char gin g circuitry that can operate with varying power supply voltage levels.

SUMMARY OF THE INVENTION

The present invention provides method and circuitry for accurately measuring the input power to a portable electronic device and its associated battery, to maximize battery charging efficiency. Broadly, the present invention provides a current sense circuit that detects and measures the amount of current supplied to the portable device, battery, a voltage sense circuit that detects the DC input voltage level, and a multiplier circuit that calculates the total input power level. The circuit further includes digital decoders in the power loop to allow the charger to accommodate AC adapters with different power levels. Thus, the invention allows for adaptive battery charging even in those systems that may have varying DC input voltage levels. The circuit further provides circuitry that allows a controller to programmably adjust the battery charging cycle.

Accordingly, in one embodiment, the present invention provides a battery charger circuit for an electronic device operated by a battery, the circuit including a voltage-control loop adapted to couple to the battery to control a voltage level of the battery to a selected voltage level; a current-control loop adapted to couple to the battery to control current delivered to the battery at a selected current magnitude; a power-control loop adapted to couple to the battery and the electronic device to control the power drawn by the charger circuit to a selected power level; and a combine circuit configured to combine outputs of the voltage-control loop, current-control loop and power-control loop, wherein, the power control loop includes a current sense circuit having first and second input terminals adapted to couple across a current sense resistor, a voltage input terminal configured to monitor an input supply voltage, and a multiplier circuit having a first input coupled to an output of the current sense circuit, a second input coupled to the voltage input terminal, and an output, the multiplier circuit being configured to generate at its output a signal representative of the power drawn from the charger circuit.

In another embodiment, the present invention provides a method of charging a battery for a battery-operated electronic device, the method including the steps of controlling the battery voltage to a selected voltage level; controlling current delivered to the battery to a selected current magnitude; controlling total input power to the battery and the battery-operated electronic device to a selected power level, wherein the step of controlling total input power includes the steps of sensing an amount of input current flowing to the battery and the electronic device, detecting an amount of input voltage supplied by a source of power, and multiplying the sensed input current with the detected input voltage to arrive at the total input power.

A better understanding of the nature and advantages of the adaptive battery charging according to the present invention may be gained with reference to the following detailed description and the accompanying drawings.

DESCRIPTION OF THE SPECIFIC EMBODIMENTS

Figure 1:
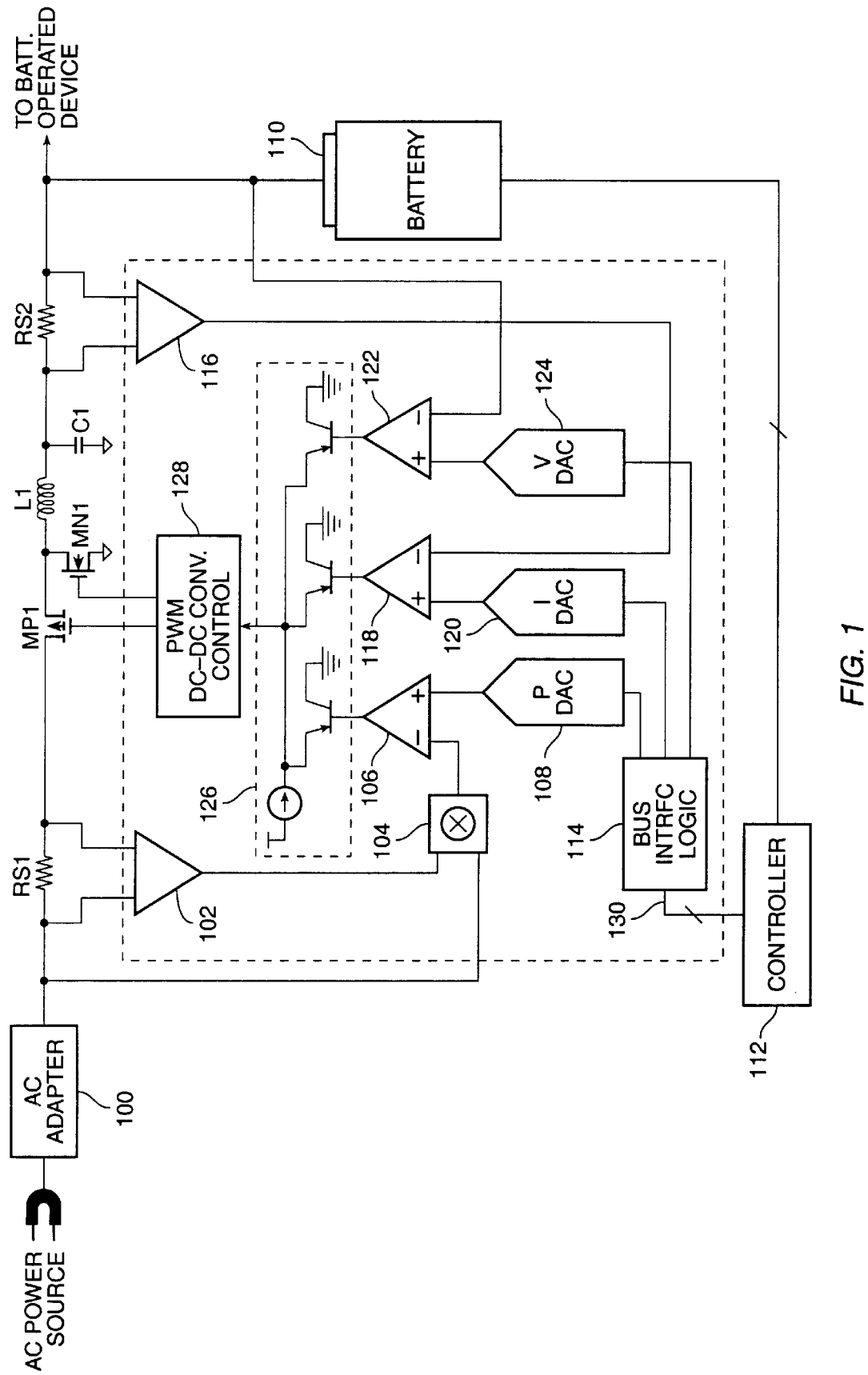
FIG. 1 is a simplified system level block diagram of the battery charger according to one embodiment of the present invention.

Referring to FIG. 1, there is shown a simplified system level block diagram of the battery charger according to one embodiment of the present invention. An AC adapter 100 receives power from an AC source and supplies power to the system. A current sense amplifier 102 has its inputs coupled across a sense resistor RS1 that is inserted along the current path between AC adapter 100 and both battery 110 and the battery operated electronic device (not shown). An output of current sense amplifier 102 is fed into one input of a multiplier 104 whose other input couples to the voltage output of AC adapter 100. Multiplier 104 multiplies a signal representing the sensed current drawn from adapter 100 by a signal representing the voltage supplied by adapter 100, and arrives at a total input power signal at its output. The output of multiplier 104 connects to the negative input of an amplifier 106. A digital-to-analog converter P_DAC 108 for the power loop has its output connected to the positive input of amplifier 108. P_DAC 108 receives digital inputs from controller 112 via bus interface logic 114. The combination of the input power measurement circuitry (current sense amplifier 102 and multiplier 104) with amplifier 106 and P_DAC 108 forms the power control loop within the battery charger circuit of the present invention.

The battery charger circuit further includes a current control loop made up of amplifier 116 whose inputs couple across a second current sense resistor RS2. The output of amplifier 116 supplies a signal representing the current delivered to the battery to the inverting input of amplifier 118. A digital-to-analog converter I_DAC 120 for the current loop has its output connected to the non-inverting input of amplifier 118. I_DAC 120 receives digital inputs from controller 112 via bus interface logic 114. A voltage control loop includes amplifier 122 that receives the battery voltage at its inverting input and the output of a digital-to-analog converter V_DAC 124 at its non-inverting input. V_DAC 124 receives digital inputs from controller 112 via bus interface logic 114. A combine or "ORing" circuit 126 receives all of the outputs of amplifiers 106, 118 and 122. The exemplary implementation for combine circuit 126 includes three common-collector PNP bipolar transistors having their emitter terminal connected together and each having its base terminal connected to an output of a respective loop amplifier. The output of combine circuit 126 drives a pulse width modulated (PWM) DC-DC converter control circuit 128. PWM control circuit 128 supplies the control signal to the gate terminal of power transistors MP1 and MN1 that regulate the charging of the battery. While the circuit shows a PWM type control circuit, it is to be understood that other types of battery charger control circuit such as those using hysteretic control and the like can be used.

The operational overview of the battery charger circuit of the present invention is as follows. Depending on the state of the battery, the charger circuitry of the present invention controls at any time one of three parameters: battery voltage, battery current or total input power. If there is adequate power available from the charger, and if the battery has been discharged, the circuit output reaches the current control limit before the voltage limit, causing the system to regulate current. As the battery charges, the voltage rises until the voltage limit is reached, and the charger switches to regulating voltage. On the other hand, if there is not enough power available for both the battery-operated electronic device and the battery charging, the circuit regulates charging current at such a level as to respect the maximum power limit. When the voltage limit is reached, the charger will similarly switch to regulating voltage. The circuit of the present invention operates such that transitions from current to voltage regulation, or from power to voltage regulation, are performed automatically by the charger.

Figure 2:
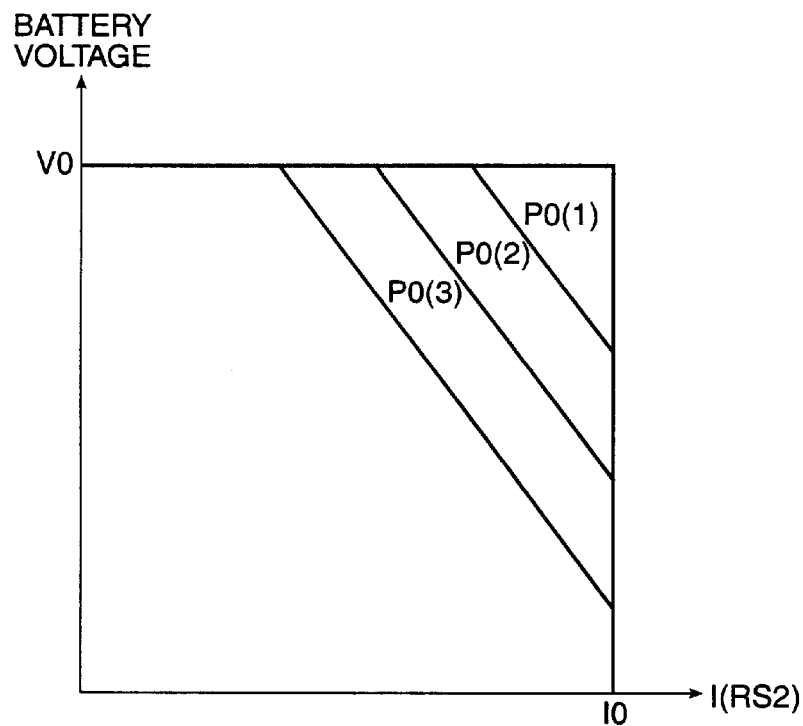
FIG. 2 illustrates the voltage-current-power characteristics of the battery charger of the present invention.

FIG. 2 illustrates the voltage-current-power characteristics of the battery charger according to the present invention. The horizontal axis in the V-I-P diagram of FIG. 2 is current delivered to the battery and the vertical axis is the battery voltage. The voltage control loop monitors the battery to ensure that its voltage is held at a selected voltage set point (V0) as set by controller 112 via V_DAC 124. The current control loop monitors current delivered to the battery to ensure that it regulates at a selected current-limit set point (I0) as set by controller 112 via I_DAC 120. The power-regulation loop monitors total input power, to both the battery and the battery-operated device, to ensure that total power drawn from the charger never exceeds a selected maximum power set point (P0) as set by control 112 via P_DAC 108. Assuming that there is adequate power available from the charger, the current control loop is in control as long as the battery voltage is below V0. When the battery voltage reaches V0, the current loop no longer regulates, and the voltage control loop takes over. If on the other hand there is not adequate power available from the charger, the power control loop is in control, and limits the charging of the battery in order to guarantee enough power for the battery-operated device. Thus, at all times, the adaptive charger circuitry according to the present invention makes the most efficient use of the available power depending on the needs of the battery and the battery-operated device.

An advantageous feature of the adaptive battery charger of the present invention is its ability to vary the rate of battery charging during the charge cycle. This allows the charger circuit to operate with lithium-ion batteries that require a fast rate of charging up until the battery is charged to a large part of its capacity, and then a reduced rate of charging for the last portion. The circuit accomplishes this by the use of separate DACs for the three control loops. Each DAC sets the threshold voltage for the amplifier in each control loop. Controller 112 supplies the digital control signal to each DAC that adjusts the loop threshold levels V0, I0, and P0. In case of the voltage control loop, the battery voltage is fed to the non-inverting input of amplifier 122. The voltage at the inverting input of amplifier 122 is set by, e.g., an 8-bit V_DAC 124. Controller 112 supplies a charging voltage CV command across bus 130. The charging voltage CV command may provide, for example, a 10 V offset, and 32 mV steps, so that the charging voltage can be anywhere from, e.g., 10 V to (10 V+$2^8$*32 mV)=18.16 V. Because a lithium-ion (Li$^+$) battery's typical per-cell voltage is 4.2V maximum. this exemplary charger would thus by best suited for 3- and 4-cell batteries. It can also be used for several different cell counts with NiMH batteries.

For the current control loop, amplifier 118 controls the battery current while the charger is regulating current. As explained above, battery current is sensed by monitoring the voltage across sense resistor RS2 with amplifier 116 designed such that it removes the common mode battery voltage. The battery current is fed to the non-inverting input of amplifier 118. The voltage at the amplifier's inverting input is set by, e.g., an 8-bit I_DAC 120, which is controlled by a charging current CI command supplied by controller 112. The charging current CI command may provide, for example, 32 mA steps, so that the charging current can be anywhere from 0 A to $2^8$*32 mA=8.16 A.

In case of the power control loop, amplifier 106 controls the system's total power consumption (ie.e, battery-operated device plus battery charging). Input voltage is monitored at the output of adapter 100, and input current is sensed by monitoring the voltage across sense resistor RS1 with amplifier 102 that is designed to remove the common mode input voltage. A more detailed description of the design of current sense amplifier 102 is provided below in connection with FIG. 3. The sensed input current and sensed input voltage are then multiplied together with multiplier 104, and the result is fed to the non-inverting input of amplifier 106. An exemplary circuit implementation for an analog multiplier suitable for use in the input power measurement circuit of the present invention will be described hereinafter in connection with FIG. 4. The voltage at the inverting input of amplifier 10 is set by, e.g., a 4-bit P_DAC 108, which is controlled by a charging power CP command supplied by controller 112. The charging power CP command may provide, for example, a 25 W offset, and 5 W steps, so that the total power drawn can be anywhere from 25 W to (25 W+15*5 W)=100 W. A sudden surge in power required by the battery-operated device may result in a momentary overload on AC adapter 100. This has no ill effects, however, because the power loop recovery time is designed to be much shorter than the adapter's thermal time constant, and the minimum adapter output voltage equals the battery voltage, which is sufficient to run the battery-operated device.

It is to be understood that the size of each DAC and the offset and step values given herein for each control loop are for illustrative purposes only, and that those skilled in the art appreciate that different size DACs with different steps and offsets can be used to achieve the goals of the invention. Further, those skilled in the art will also appreciate that there are other various types of circuitry that can be used to adjust the control loop thresholds. For example, reprogrammable memory elements such as electrically erasable programmable read only memory (EEPROM) cells can be used to program the desired threshold level for each loop in the circuit.

The actual control of the battery charging is performed by pulse-width-modulated (PWM) DC-DC converter controller 128. PWM control circuit 128 drives two external MOSFETs, an N-channel (MN1)and a P-channel (MP1), which switch the voltage from the input source. This switched voltage feeds an inductor L1, which filters the switched rectangular wave. PWM control circuit 128 sets the pulse width of the switched voltage so that it supplies the desired voltage or current to battery 110. PWM control circuit 128 includes a comparator (not shown) that compares the lowest of three input signals from the three control loops with a ramp, to determine the pulse width of the switched signal, setting the battery voltage or current. When the current-sense amplifier is in control of the PWM, the PWM comparator adjusts the duty cycle of the switches, regulating the average battery current and keeping it proportional to the error voltage. When the voltage error amplifier is in control of the PWM, the PWM comparator adjusts the duty cycle of the switches, regulating the battery voltage and keeping it proportional to the error voltage. When the power error amplifier is in control of the PWM, the PWM comparator adjusts the duty cycle of the switches, regulating the total power drawn from the charger. The loop determines whether the total power available from the wall adapter is sufficient to provide both the load and battery charging needs. If not, the charging power to the battery is reduced by the amount needed to keep the total demand within the AC–DC output power limit of the adapter. Those skilled in this art appreciate that battery charging control techniques other than PWM (e.g., hysteretic control, etc.) can also be used in conjunction with the adaptive battery charging technique of the present invention.

Figure 3:
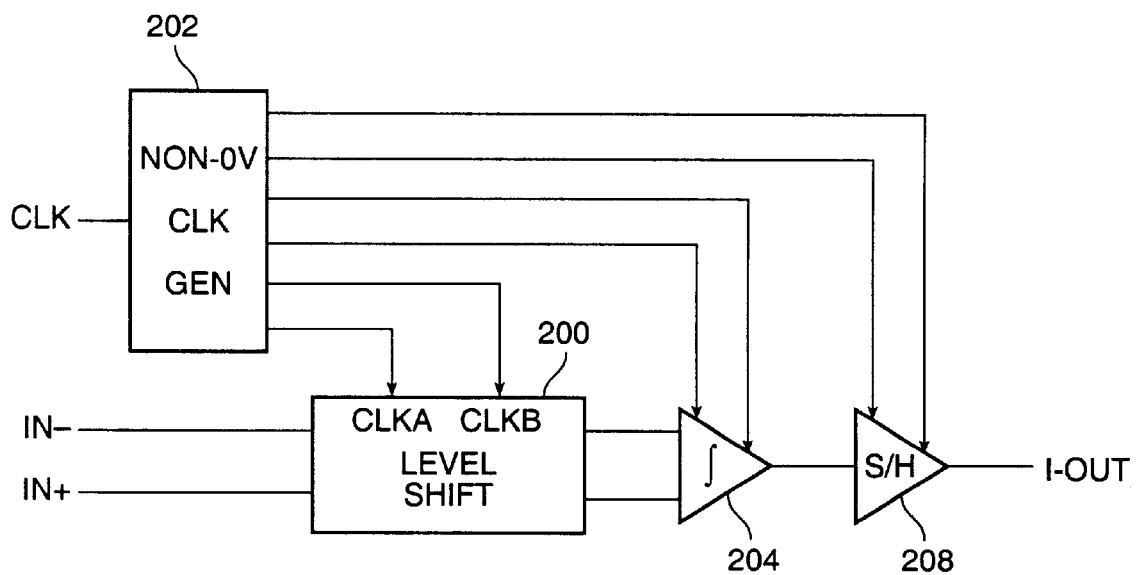
FIG. 3 is a circuit diagram of an exemplary current sense amplifier for use in the battery charger circuit of the present invention.
Figure 4:
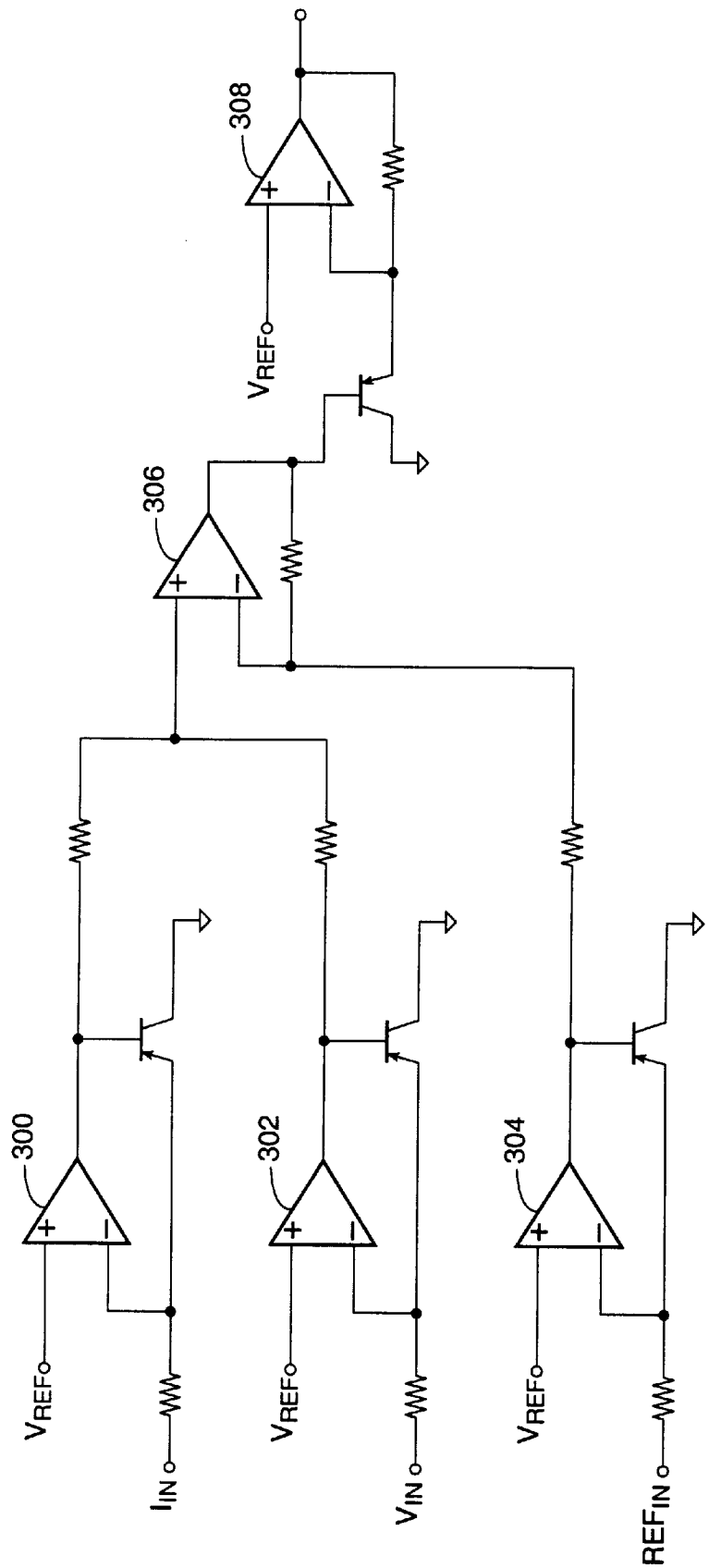
FIG. 4 is a circuit diagram of an exemplary analog multiplier for use in the input power monitoring loop of the present invention.

Another advantageous feature of the battery charger circuit of the present invention is its ability to operate with varying types of AC adapters. In measuring the total input power, instead of assuming a constant DC input voltage, the battery charger circuit of the present invention provides a multiplier to multiply the sensed input current with whatever DC input voltage level that is supplied by AC adapter 100. This enables the battery charger to operate with various AC adapters. e.g., 40 W, 50 W, or 75 W. Because of the large common mode signal at the output of adapter 100, current sense amplifier 102 and multiplier 104 are designed to accommodate this type of input signal. FIG. 3 shows an exemplary circuit implementation for current sense amplifier 102. A level shift circuit 200 receives the signals IN– and IN+ from across sense resistor RS1. With the aid of non-overlapping clock signals generated by clock generator 202, a switched-capacitor circuit using high voltage MOS transistors inside level shift circuit 200, commutates the high voltage input from e. g., 20 volt range down to e.g., 5 volt range. The output of level shift circuit 200 is applied to a switched-capacitor integrating differential amplifier 204. The output of integrating differential amplifier 204 is then applied to a sample and hold circuit 208 that extracts the current information from one phase of the clock. FIG. 4 shows an exemplary circuit implementation for multiplier 100. According to this embodiment, an analog multiplier is implemented by log amplifiers 300 and 302 respectively receiving the current input and the voltage input. A third log amplifier 304 buffers a reference voltage. A summing amplifier 306 receives the outputs of the three log amplifiers. The output of summing amplifier 306 is then applied to an anti-log amplifier 308 to generate the final output.

In conclusion, the present invention provides a highly flexible adaptive battery charger circuit that optimizes the efficiency of battery charging. The battery charger provides internal multiplier circuitry to measure input power allowing it to be used with AC adapters having different wattage. It further includes circuitry to digitally adjust threshold levels for the various control loops within the charger circuitry. While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents.

What is claimed is:

1. A battery charger circuit for an electronic device operated by a battery, the circuit comprising:

a voltage control loop adapted to couple to the battery to control a voltage level of the battery to a selected voltage level;

a current control loop adapted to couple to the battery to control current delivered to the battery at a selected current magnitude;

a power control loop adapted to couple to the battery and the electronic device to control the power drawn by the charger circuit to a selected power level; and a combine circuit configured to combine outputs of the voltage control loop, current control loop and power control loop, wherein, the power control loop comprises:

a current sense circuit having first and second input terminals adapted to couple across a current sense resistor, a voltage input terminal configured to monitor an input supply voltage, and a multiplier circuit having a first input coupled to an output of the current sense circuit, a second input coupled to the voltage input terminal, and an output, the multiplier circuit being configured to generate at its output a signal representative of the power draw from the charger circuit.

2. A battery charger circuit for an electronic device operated by a battery, the circuit comprising:

a voltage control loop adapted to couple to the battery to control a voltage level of the battery to a selected voltage level;

a current control loop adapted to couple to the battery to control current delivered to the battery at a selected current magnitude;

a power control loop adapted to couple to the battery and the electronic device to control the power drawn by the charger circuit to a selected power level; and a combine circuit configured to combine outputs of the voltage control loop, current control loop and power control loop, wherein, the power control loop comprises:

a current sense circuit having first and second input terminals adapted to couple across a current sense resistor, a voltage input terminal configured to monitor an input supply voltage, a multiplier circuit having a first input coupled to an output of the current sense circuit a second input coupled to the voltage input terminal and an output, the multiplier circuit being configured to generate at its output a signal representative of the power draw from the charger circuit;

a first amplifier having a first input coupled to the output of the multiplier circuit, a second input, and an output; and a first digital-to-analog converter having an output coupled to the second input of the first amplifier and a plurality of inputs configured to receive digital power control signal, wherein, the selected power level is set by the digital power control signal.

3. The battery charger circuit of claim 2 wherein the current control loop comprises:

a second amplifier having first and second terminals adapted to couple across a second current sense resistor;

a third amplifier having a first input coupled to an output of the second amplifier; and a second digital-to-analog converter having an output coupled to a second input of the third amplifier, and a plurality of inputs configured to receive digital current control signal, wherein, the selected current magnitude is set by the digital current control signal.

4. The battery charger circuit of claim 3 wherein the voltage control loop comprises:

a fourth amplifier having a first input adapted to be coupled to the battery, a second input, and an output; and a third digital-to-analog converter having an output coupled to the second input of the fourth amplifier and a plurality of inputs configured to receive digital voltage control signal, wherein, the selected voltage level is set by the digital voltage control signal.

5. The battery charger circuit of claim 4 further comprising a charger control circuit having an input coupled to an output of the combine circuit and an output coupled to control the battery voltage or current or input power.

6. The battery charger circuit of claim 5 wherein the charger control circuit is a pulse-width-modulated DC-DC converter controller configured to compare the output of the combine circuit with a ramping signal.

7. The battery charger circuit of claim 6 wherein the combine circuit comprises circuitry configured to perform a logical OR function.

8. The battery charger circuit of claim 7 wherein the circuitry configured to perform a logical OR function comprises three common-collector bipolar transistors having their emitter terminal coupled together, and each having a base terminal coupled to respective output of first, third and fourth amplifiers.

9. The battery charger circuit of claim 4 wherein the first digital-to-analog converter (DAC) is a 4-bit DAC, and the second and third digital-to-analog converters are each 8-bit DACs.

10. The battery charger circuit of claim 1 wherein the multiplier circuit comprises an analog multiplier circuit comprising:

a first log amplifier having an input coupled to receive the output of the current sense circuit;

a second log amplifier having an input coupled to receive the input supply voltage;

a summing amplifier having a first input coupled to an output of the first log amplifier, and a second input coupled to an output of the second log amplifier; and an anti-log amplifier having an input coupled to an output of the summing amplifier.

11. The battery charger circuit of claim 10 wherein the current sense circuit comprises:

a level shift circuit having first and second inputs coupled to receive a current signal across the current sense resistor, the level shift circuit being configured to reduce a high voltage common mode component of the current signal to a lower voltage; and an integrating differential amplifier coupled to the level shift circuit.

12. The battery charger of claim 11 wherein the level shift circuit comprises switched-capacitor circuitry configured to commutate the high voltage common mode component of the current signal to the lower voltage in response to non-overlapping clock signals.

13. The battery charger of claim 12 wherein the current sense circuit further comprises a sample and hold circuit coupled to the integrating differential amplifier.

14. An adaptive battery charger circuit comprising:

a current control loop having an amplifier with a first input coupled to a signal representing battery current and a second input coupled to an output of a digital-to-analog converter;

a voltage control loop having an amplifier with a first input coupled to a signal representing battery voltage and a second input coupled to an output of a digital-to-analog converter; and a power control loop having an amplifier with a first input coupled to a signal representing input power and a second input coupled to an output of a digital-to-analog converter.

15. The adaptive battery charger circuit of claim 14 further comprising:

a combine circuit configured to combine outputs of the current control loop, voltage control loop and power control loop; and a charger control circuit having an input coupled to the combine circuit and an output coupled to battery charging circuitry.

16. The adaptive battery charger circuit of claim 15 wherein each digital-to-analog converter sets a threshold level for its respective control loop in response to a digital control signal from a system controller.

17. A method of charging a battery for a battery-operated device, comprising the steps of:

sensing an input current supplied by a power supply source;

sensing an input voltage supplied by a power supply source;

calculating an input power by multiplying the sensed input current with the sensed input voltage;

detecting a magnitude of current being delivered to the battery;

detecting a voltage level of the battery; and varying an amount of charge being supplied to the battery in response to the charging needs of the battery and the power needs of the battery-operated device.

18. The method of claim 17 wherein the step of varying comprises the steps of:

regulating the magnitude of current being delivered to the battery as long as the voltage level of the battery is below a selected level, and the calculated input power is below a maximum level;

regulating the voltage level of the battery when the voltage level of the battery reaches the selected level, and as long as the calculated input power is below the maximum level; and limiting the amount of charge being supplied to the battery when the calculated input power reaches the maximum level.

19. A battery charging system for a battery-operated device, comprising:

an AC adapter configured to convert an AC power signal to a DC power signal; and an adaptive battery charger circuit coupled to the AC adapter, the charger circuit comprising:

a power control loop configured to measure an amount of input power and to regulate an amount of charge being delivered to the battery based on a power threshold level, a current control loop configured to sense an amount of current being delivered to the battery and to regulate an amount of charge being delivered to the battery based on a current threshold level, and a voltage control loop configured to detect the battery voltage level and to regulate an amount of charge being delivered to the battery based on a voltage threshold level;

a controller coupled to the adaptive battery charger circuit, wherein, the controller digitally varies the power threshold level, the current threshold level and the voltage threshold level depending on the system requirements.

20. The battery charging system of claim 19 wherein the power control loop comprises:

a current sense circuit configured to sense an amount of input current supplied by the adapter;

a voltage sense circuit configured to detect an amount of input voltage supplied by the adapter; and a multiplier coupled to the current sense circuit and the voltage sense circuit, and configured to calculate the amount of input power by multiplying the sensed input current with the sensed input voltage.

* * * * *